(12) United States Patent
Chaudhuri et al.

(10) Patent No.: US 10,776,704 B2
(45) Date of Patent: Sep. 15, 2020

(54) METHOD AND SYSTEM FOR BUILDING DOMAIN INTELLIGENT SOLUTION

(71) Applicant: Tata Consultancy Services Limited, Mumbai (IN)

(72) Inventors: Subhrojyoti Roy Chaudhuri, Pune (IN); Swaminathan Natarajan, Pune (IN); Harrick Mayank Vin, Pune (IN); Goldsmith Murali Krishna, Pune (IN); Puneet Patwari, Pune (IN); Rahul Ramesh Kelkar, Pune (IN); Amrish Shashikant Pathak, Pune (IN); Adwait Inamdar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 861 days.

(21) Appl. No.: 15/259,930

(22) Filed: Sep. 8, 2016

(65) Prior Publication Data
US 2017/0098160 A1 Apr. 6, 2017

(30) Foreign Application Priority Data
Sep. 9, 2015 (IN) .......................... 3464/MUM/2015

(51) Int. Cl.
*G06N 5/02* (2006.01)
*G06N 5/00* (2006.01)

(52) U.S. Cl.
CPC .............. *G06N 5/022* (2013.01); *G06N 5/00* (2013.01); *G06N 5/02* (2013.01)

(58) Field of Classification Search
CPC .............. G06N 5/00; G06N 5/02; G06N 5/22
USPC .............................................. 706/50, 60, 61
See application file for complete search history.

(56) References Cited

U.S. PATENT DOCUMENTS

| 8,712,947 | B2  |   | 4/2014 | Shanmukh et al. |              |
|-----------|-----|---|--------|-----------------|--------------|
| 8,832,641 | B2  |   | 9/2014 | Schneider       |              |
| 2004/0019672 | A1 | * | 1/2004 | Das          | G06N 5/00 709/223 |
| 2011/0191270 | A1 | * | 8/2011 | Peng         | G06N 5/04 706/10 |

(Continued)

OTHER PUBLICATIONS

Ou, S. e tal. (2006). "A Model Driven Integration Architecture for Ontology-Based Context Modeling and Context-Aware Application Development," *Lecture Notes in Computer Science*, vol. 4066; pp. 188-197.

(Continued)

*Primary Examiner* — Shane D Woolwine
(74) *Attorney, Agent, or Firm* — Finnegan, Henderson, Farabow, Garrett & Dunner LLP

(57) ABSTRACT

A method and system is provided for building domain intelligent solution. The present application provides a method and system for building a domain intelligent solution, comprises of utilizing a language existing as a generic model for capturing intrinsic knowledge pertaining to a technical domain; creating a domain intelligent solution for said technical domain using said language or vocabulary; translating the domain intelligent solution into required wrappers for them to be integrated with a third party technology or tool; and integrating said created domain intelligent solution with the third party technology or tool for providing system engineering capabilities to make them domain intelligent.

7 Claims, 5 Drawing Sheets

(56) References Cited

U.S. PATENT DOCUMENTS

2014/0188936 A1    7/2014    Rambhia et al.

OTHER PUBLICATIONS

Sutcliffe, A. et al. (May 2014). "End-user development by application-domain configuration," *The Journal of Systems and Software*, vol. 91 ; pp. 1-15.

* cited by examiner

METHOD AND SYSTEM FOR BUILDING DOMAIN INTELLIGENT SOLUTION

PRIORITY CLAIM

This application claims priority under 35 U.S.C. § 119 from India Application No. 3464/MUM/2015, filed on Sep. 9, 2015. The entire contents of the aforementioned application are incorporated herein by reference.

TECHNICAL FIELD

The present application generally relates to system engineering solutions. Particularly, the application provides a method and system for building domain intelligent solution.

BACKGROUND

The technical domain of systems engineering is currently supported by a plurality of cutting edge technologies such as technologies implementing UML, SysML specifications, and integrated development environment to develop control systems and many alike. Such similar technologies are being used extensively during the requirement analysis, design and development phases of system development in the technical domain. However, the challenge with using majority of existing technologies is that they are not aware of the underlying domain problem for which a particular solution is being created using these technologies. Hence, most of the domain knowledge which is required for carrying out the engineering solutions should essentially come from the domain experts and implemented by re-engineering using the existing technologies. Prior art lack in providing domain intelligent solution, wherein domain awareness may be imparted in non-intrusive manner and required support could be built as wrappers around the existing technologies.

Prior art literature illustrates various tool, however none of them is able to help users to work through a particular problem systematically, by significantly reducing the need of re-engineering of the existing technologies and manual input from domain experts. Thereby, consequent problems may include leading to low productivity and enormous manual efforts, gaps between requirement and solution, missed requirements, omissions, missed requirements, missed design considerations, and lack of knowledge reuse.

Prior art literature also illustrates various solutions, however the challenge still remains to complement the existing tools and methodologies used to create domain specific solutions by building domain intelligence into them. There exist a need for a solution for building domain intelligent solution capable of capturing knowledge about said domain in such a form that allows system and tool capability to be specialized to particular instances of said domain. Thereby, building domain intelligent solution by significantly reducing the need of re-engineering of the existing technologies and manual input from domain experts is still considered as one of the biggest challenges of the technical domain.

OBJECTIVES OF THE INVENTION

In accordance with the present invention, the primary objective is to provide a method and system for building domain intelligent solution.

Another objective of the invention is to provide a method and system for building domain intelligent solution with a particular viewpoint such as systems engineering viewpoint, control systems engineering viewpoint and developing a metamodel reflecting said viewpoint for enabling the solution or tool to behave intelligently with respect to any usage domain, from that viewpoint.

Another objective of the invention is to provide a method and system for building domain intelligent solution, for capturing knowledge about said domain in such a form that allows system and tool capability to be specialized to particular instances of said domain.

Another objective of the invention is to provide a method and system for building domain intelligent solution, complementing the existing tools and methodologies used to create domain specific solutions by imparting domain awareness in a non-intrusive way.

Another objective of the invention is to provide a method and system for building domain intelligent solution by significantly reducing the need of re-engineering of the existing technologies and manual input from domain experts.

Another objective of the invention is to provide a method and system for building domain intelligent solution, by imparting domain awareness in a non-intrusive way and have the required support built as wrappers around the existing technologies.

Another objective of the invention is to provide a method and system for building domain intelligent solution enabling existing tools to have knowledge about user's particular domain and help them work systematically through the problem.

Yet another objective of the invention is to provide a method and system for building domain intelligent solution for reducing omissions, missed requirements, missed design considerations, gaps between requirement and solution and increasing productivity, reducing manual efforts and enabling knowledge reuse.

Other objects and advantages of the present invention will be more apparent from the following description when read in conjunction with the accompanying figures, which are not intended to limit the scope of the present disclosure.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for building domain intelligent solution.

The present application provides a computer implemented method for building a domain intelligent solution comprising processor implemented steps of utilizing a language existing as a generic model for capturing intrinsic knowledge pertaining to a technical domain; creating a domain intelligent solution for said technical domain using said language or vocabulary; translating the domain intelligent solution into required wrappers for them to be integrated with a third party technology or tool; and integrating said created domain intelligent solution with the third party technology or tool for providing system engineering capabilities to make them domain intelligent.

The present application provides a system for building a domain intelligent solution. The system (200) comprising a processor (202); a computer-usable medium embodying computer code, said computer-usable medium being coupled to said processor (202), said computer program code comprising instructions executable by said processor (202) and configured to operate a language utilization module (204); a domain intelligent solution creation module (206); a compiler and translation module (208); a domain intelligent solution integration module (210); and a repository (212).

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION

Figure 1:
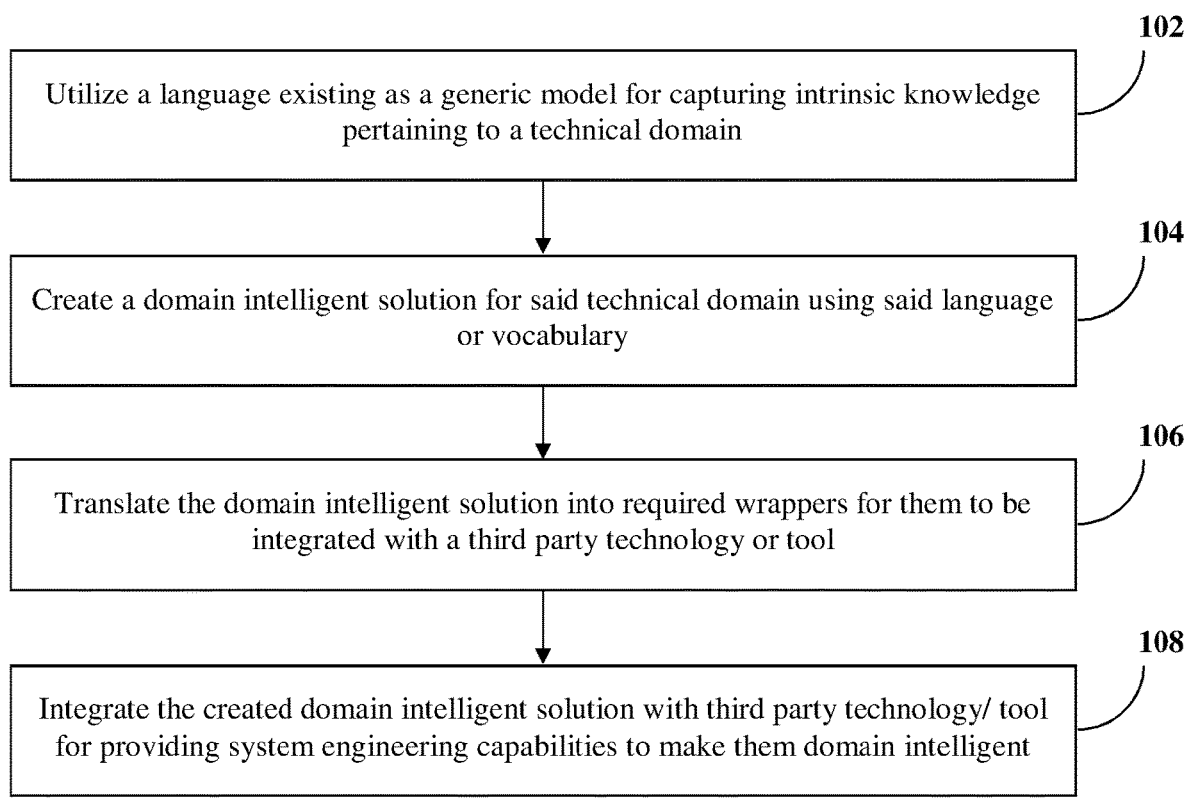
FIG. 1: shows a flow chart illustrating a method for building domain intelligent solution.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input unit to perform the functions described and to generate an output displayed upon any of the plurality of output device.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

The present application provides a computer implemented method and system for building domain intelligent solution. The method and system is provided for building domain intelligent solution with a particular viewpoint such as systems engineering viewpoint, control systems engineering viewpoint and developing a metamodel reflecting said viewpoint for enabling the solution or tool to behave intelligently with respect to any usage domain, from that viewpoint. The present invention provide a method and system for building domain intelligent solution, for capturing knowledge about said domain in such a form that allows system and tool capability to be specialized to particular instances of said domain. However, such reuse is intended for situations where each domain intelligent solution is provided for an instance or a subdomain of a known domain such as different operating systems, different services to be delivered. The characteristics applicable to said domain are known, and the specific values of such characteristics for each instance are captured in the domain intelligent solution. Further, the present invention complements the existing tools and methodologies used to create domain specific solutions by imparting domain awareness in a non-intrusive way. The present invention also provides a method and system for building domain intelligent solution by significantly reducing need of re-engineering of the existing technologies and manual input from domain experts. Further, the present invention provides a method and system for building domain intelligent solution, by imparting domain awareness in a non-intrusive way and have the required support built as wrappers around the existing technologies. Additionally, the present invention provides a method and system for building domain intelligent solution enabling existing tools to have knowledge about user's particular domain and help them work systematically through the problem. Furthermore, the present invention provides a method and system for building domain intelligent solution for reducing omissions, missed requirements, missed design considerations, gaps between requirement and solution and increasing productivity, reducing manual efforts and enabling knowledge reuse. It should be noted that the domain intelligent solution and domain aware tooling and domain knowledge model is used interchangeably throughout the specification.

Referring to FIG. 1 is a flow chart illustrating a method for building domain intelligent solution.

The process starts at step 102, a language existing as a generic model is utilized for capturing intrinsic knowledge pertaining to a technical domain. At the step 104, a domain intelligent solution is created for said technical domain using said language or vocabulary. At the step 106, the domain intelligent solution is translated into required wrappers for them to be integrated with a third party technology or tool. The process ends at the step 108, said created domain intelligent solution is integrated with the third party technology or tool for providing system engineering capabilities to make them domain intelligent.

Figure 2:
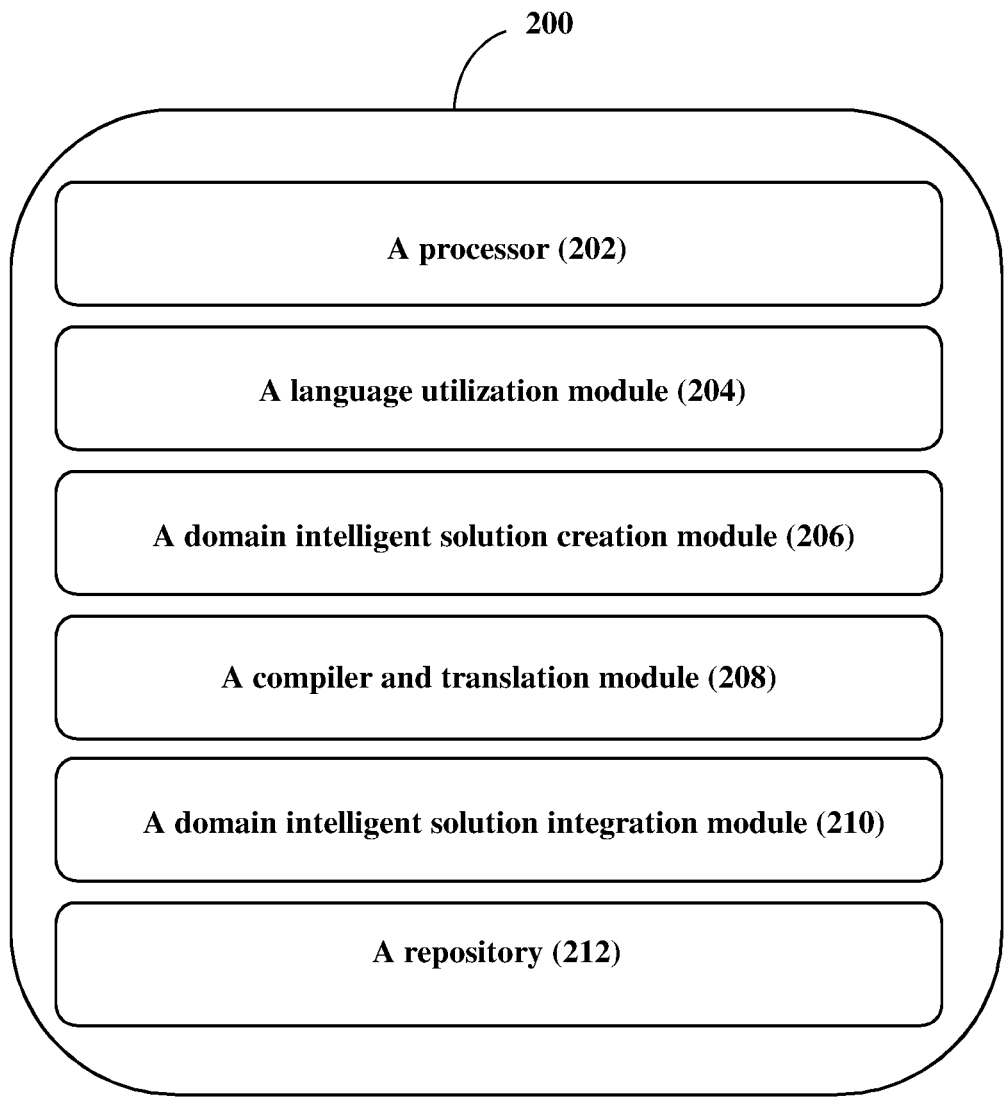
FIG. 2: shows a block diagram illustrating system (200) architecture for building domain intelligent solution.

Referring to FIG. 2 is a block diagram illustrating system (200) architecture for building domain intelligent solution.

In an embodiment of the present invention, a system is provided for building domain intelligent solution. The system for building domain intelligent solution comprising a processor (202); a computer-usable medium embodying computer code, said computer-usable medium being coupled to said processor (202), said computer program code comprising instructions executable by said processor (202) and configured to operate a language utilization module (204); a domain intelligent solution creation module (206); a compiler and translation module (208); a domain intelligent solution integration module (210); and a repository (212).

In another embodiment of the present invention, the language utilization module (204) is adapted for utilizing a language existing as a generic model for capturing intrinsic knowledge pertaining to a technical domain. The language existing as the generic model for capturing intrinsic knowledge pertaining to said technical domain is built using a set of system concepts identified as a set of model elements and their interdependencies pertaining to said technical domain, such as it defines concepts such as system with capabilities that may serve certain purpose. Hence, using such a generic language it becomes possible to capture knowledge such as 'In radio astronomy' a 'Receptor' system implements the capability to 'receive RF signal' to 'track an astronomical source'.

In another embodiment of the present invention, the domain intelligent solution creation module (206) is adapted for creating a domain intelligent solution for said technical domain using said language or vocabulary in a domain intelligent solution environment (300).

In another embodiment of the present invention, the compiler and translation module (208) is adapted for translating the domain intelligent solution into required wrappers for them to be integrated with a third party technology or tool. The translation of the domain intelligent solution into required wrappers for them to be integrated with the third party technology or tool using the compiler and translation module (208) is done through automatic generation of additional libraries or wrappers. The compiler and translation module (208) incorporates translators to translate the domain intelligent solution into various formats, such as technologies that support SysML such as Rhapsody, Cameo, it generates sysml models as domain libraries so that these tools may import them in their environment to function in a more domain aware manner. The compiler and translation module (208) may also translators implemented to support other engineering platforms such as control system development tools like EPICS, so that they can by default have support for controlling specific aspects pertaining to a specific domain such as Radio Astronomy. This will also lead to generation of more domain aware user interfaces.

In another embodiment of the present invention, the domain intelligent solution integration module (210) is adapted for integrating said created domain intelligent solution with the third party technology or tool for providing system engineering capabilities to make them domain intelligent. The domain intelligent solution is retrofitted with the information created using the third party technology or tool.

In another embodiment of the present invention, the repository (212) is adapted for storing, fetching, enabling versioning, exporting the domain intelligent solution and associate knowledge. The repository (212) is adapted for storing the domain intelligent solution, fetching the domain intelligent solution, enabling versioning of the domain intelligent solution, and enabling exporting of the domain intelligent solution to formats that are communicable through various communication means such as reports, xml files etc. Systems engineering tools access the repository (212) based on the metamodel elements, extract the relevant domain knowledge elements, and use the same to interact with the users. For example, the requirements tool may prompt the user with "Specify control objectives for the frequency reference" and step the user through specific control objectives: stability, availability etc.

Figure 3:
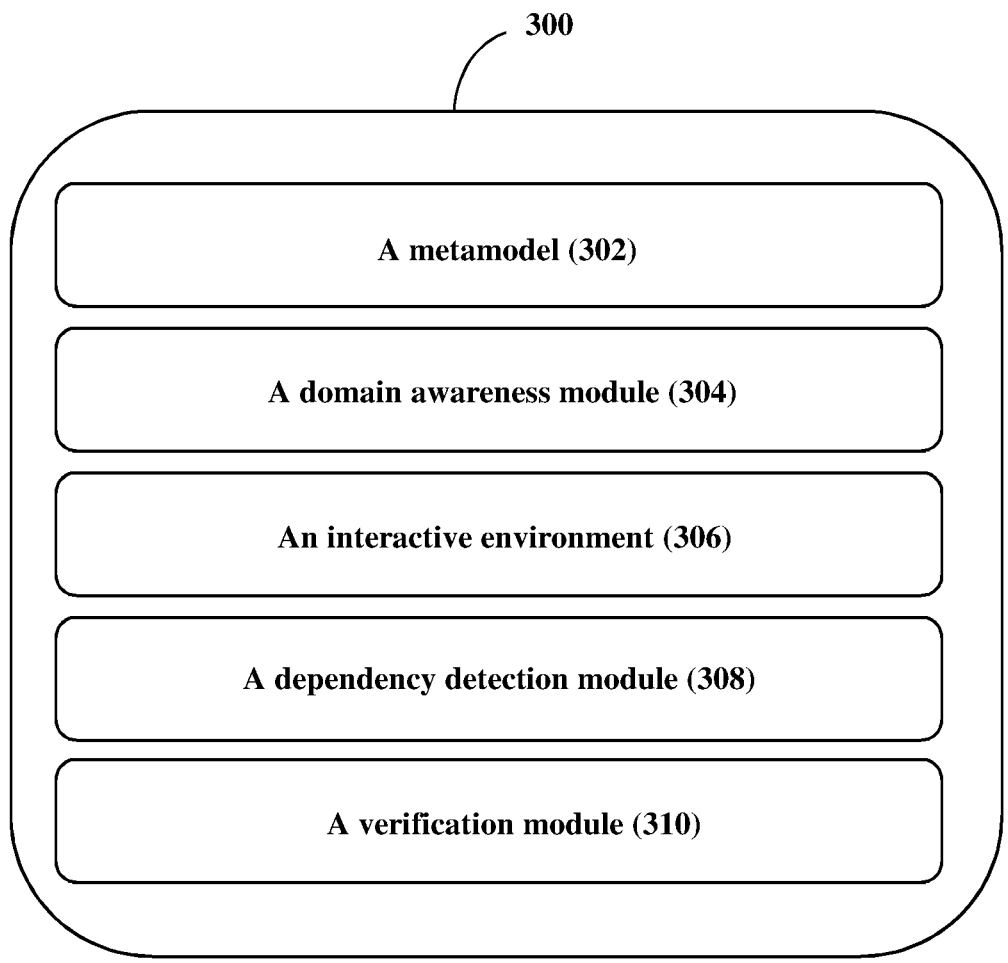
FIG. 3: shows a block diagram illustrating a domain intelligent solution environment (300)

Referring to FIG. 3 is a block diagram illustrating a domain intelligent solution environment (300).

In another embodiment of the present invention, the domain intelligent solution environment (300) comprising a metamodel (302); a domain awareness module (304); an interactive environment (306); a dependency detection module (308); and a verification module (310).

In another embodiment of the present invention, the metamodel (302) is adapted for capturing a set of concepts related to performing system engineering activities for the technical domain. The set of concepts related to performing system engineering activities is selected from a group comprising but not limited to requirements, design, and testing. The set of concepts are defined based on the theory of systems and further representing these concepts in terms of a generic meta model. The set of concepts help to synthesize knowledge from various existing domains in a uniform manner. A common metamodel of systems engineering concepts is developed, such that the key relevant aspects of any application domain can be expressed in terms of these concepts. Further, the metamodel (302) enables adaptation of the third part technology or tool behavior to different usage domains. Different domains may have different concepts, such as different sets of entities, different quality attributes, different stakeholders etc. The concepts in thedomain may be represented as a model. Metamodeling using the metamodel (302) allows to look at the question of what is the common structure among all these models.

In another embodiment of the present invention, the interactive environment (306) is adapted for enabling user to populate a domain awareness module (304) with knowledge related to the technical domain.

In another embodiment of the present invention, the dependency detection module (308) is adapted for providing user assistance through auto detection of a set of potential dependencies of the technical domain related to specified knowledge.

In another embodiment of the present invention, the verification module (310) is adapted for performing verification on the specified knowledge by performing consistency check.

In an exemplary embodiment of the present invention, a knowledge model of the radio telescope domain is developed from a control systems perspective. The domain intelligent solution may be used by control systems engineering tools to intelligently elicit requirements for control systems, to facilitate system designers to systematically express their design in domain terms etc. The domain intelligent solution is generic and provides the ability to integrate with standard development environments like Eclipse so that users can use them to create the domain intelligent solution. Consider a situation where a project related to Radio Astronomy is in the phase of capturing requirements about a Radio Telescope using the commercial requirements capturing tool Jama. As part of this process all the requirement worked out needs to be populated into the database of Jama. In order to do so, one would create the structure of the requirements capture template and have the structure incorporated in Jama. An example of a requirement captured using this process is shown in Table 1.

TABLE 1

| ID | Requirement | Allocation |
| --- | --- | --- |
| SYS_REQ-2150 | XYZ correlator integration rate. The XYZ correlator for each sub array shall have independently configurable visibility integration periods in the range 6 s to 0.6 s. | CSP, SDP |

The Table 1 above shows an example of a requirement captured for a Radio Telescope XYZ where the text specified in the Requirement column is allocated to the components named CSP and SDP of the Radio Telescope as specified in the Allocation column. The Table 1 above shows the structure of the template using which the requirements are captured. The template comprises of columns such as ID, Requirement and Allocation. This template is manually created by the System Engineers of the project before it is used to capture the specific requirements of the projects.

According to the present invention, the required templates for capturing requirements for a Radio Astronomy project as per the input formats of a tool like Jama will be automatically made available. Hence, the System Engineers of the Radio Astronomy project would start with a default Jama template as shown in Table 2.

TABLE 2

| ID | Telescope | Entity | Capability | Attribute | Value | Units | Constraints |
| --- | --- | --- | --- | --- | --- | --- | --- |
| REQ-2150 | XYZ | Correlator | Integration | Visibility Integration Periods | 0.6-6 | secs | Independently configurable for each subarray |

According to the Table 2, a finer grained template is made available identifying domain specific areas as columns allowing the requirement to be specified in a much more structured and hence precise manner. The template is also prepopulated with a lot of domain specific data by default in order to indicate the standard areas of concerns for which requirements will need to be captured. For example it is prepopulate the Entity column with Correlator with all its standard capabilities such as Integration etc. listed in the Capability column, so that all requirements about Correlator integration is captured as part of the requirements.

Figure 4:
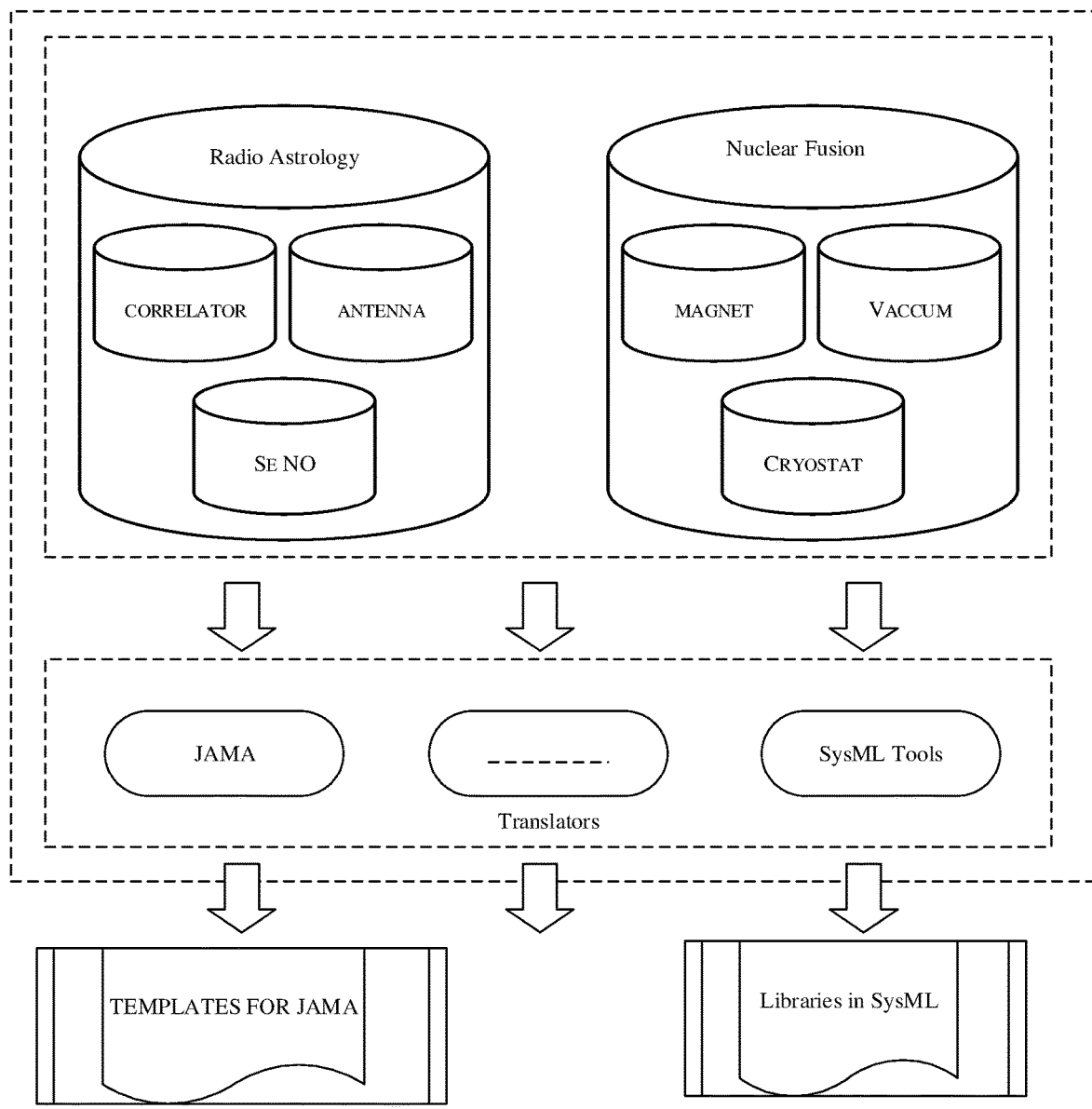
FIG. 4 and FIG. 5: shows a block diagram illustrating overview of process for building domain intelligent solution in Radio Telescope.
Figure 5:
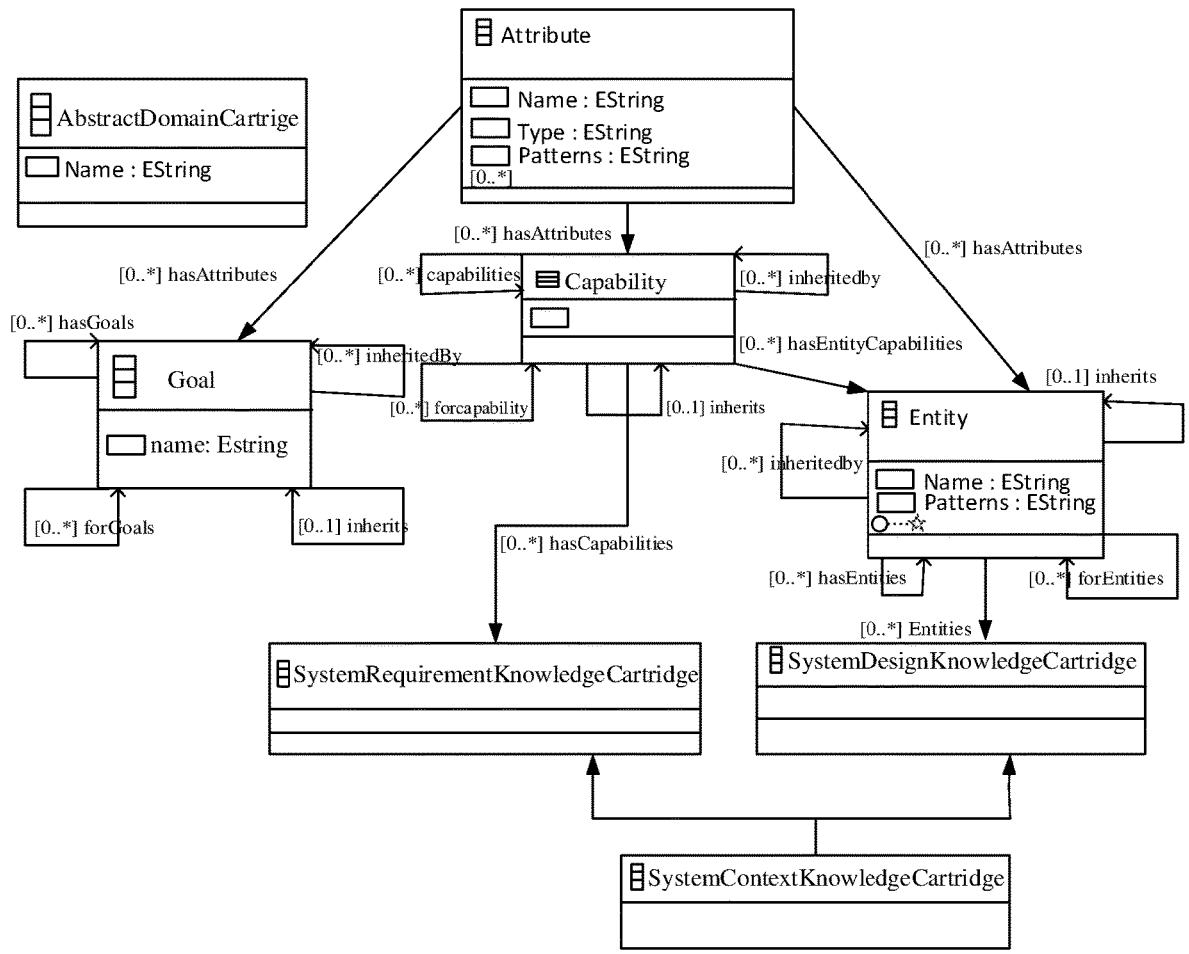

Referring to FIG. 4 and FIG. 5 is a block diagram illustrating overview of process for building domain intelligent solution in Radio Telescope.

In another exemplary embodiment of the present invention, a repository of knowledge is maintained, which is related to the engineering life cycle of various systems belonging to various domains such as Radio Telescope, Nuclear Fusion and so on. The invention also incorporates various translators to translate the knowledge into various third party tool specific formats in order to make them domain aware. Hence, the output of the translators are tool specific templates and libraries that can be imported into those third party tools making them domain aware. According to the exemplary embodiment of the present invention, capture domain knowledge and store in the appropriate knowledge repositories; write translators for the third party system engineering tool which needs to be made domain aware; execute the translators using the appropriate knowledge and generate artefacts as per the format of the third party engineering platforms; and deploy the generated artefacts in the third party tools to make the tools domain intelligent.

In an exemplary embodiment of the present invention, wherein establishing the requirements for large complex systems takes considerable time and effort. In the case of SKA, the overall system requirements have been worked out in the form of a collection of requirements statements, complemented by a set of technical and science use cases. The creation of these artifacts required several staff years of effort, and the review and refinement of these requirements involved hundreds of people over several months. This is typical for projects of this size and complexity. Reviewing requirements for consistency and completeness involves two aspects: ensuring mutual consistency amongst the set of artifacts created by the project such as stakeholder goals, use cases, requirements statements, and ensuring that the use cases and requirements are consistent with domain aspects and cover the range of concerns in radio telescope engineering.

In another embodiment of the present invention, currently domain-related content in use cases and requirements is expressed primarily in natural language, limiting the support that can be provide by system engineering tools. SKA has a strong commitment to state-of-the-art systems engineering, using both a requirements management tool such as Jama™ and a systems modeling tool such as SysML modeling using Cameo Systems Modeler™. The requirements management tool contributes book-keeping: set of information fields, change management support, collaboration support. The system modeling tool contributes diagramming and model structuring features, activity sequences in swim-lanes that support people in doing requirements analysis. All the actual work of ensuring completeness and consistency is done by people: the internal logic of the requirements is not visible to the tools. The same phenomenon is observed when one looked at the problem of reuse of requirements knowledge from previous similar projects such as the SKA precursors MeerKAT and ASKAP. While the actual requirements are necessarily different for each telescope, one would expect that the fundamental set of concerns would be similar enough so that previous projects could provide at least a partial template to aid the requirements capture process. But in practice, any such reuse is effected entirely by the participation of people familiar with previous projects, with tools contributing little. The root cause for such limited support is that system engineering tools, by their very nature, understand the engineering process but not the problem domain to which they are applied, in this case radio telescopes. Since the requirements activity relates entirely to the problem domain, the contents of the requirements are completely opaque to the tools.

In another embodiment of the present invention, a structured model of the domain knowledge is build relating to typical stakeholder needs and requirements. Further, converting the natural language information contained in use cases and requirements statements to structured information, and populate them into system models that are derived from the domain models. With this approach, domain models serve as checklists for completeness, and tools can check for content consistency between the system models and domain knowledge, as well as internal consistency within the system models. It is also possible to check for consistency between stakeholder needs and system requirements, subject to engineers manually providing some additional information about the mappings between them. The domain knowledge itself can be reused across projects, improving its own completeness.

In another embodiment of the present invention, modeling of the domain and the system is done, wherein establishing requirements involves two activities: first, stakeholder needs are established through use cases. Further, specific system requirements are identified, based on the use cases together with implicit quality and contextual requirements such as availability, regulatory compliance. To convert the artifacts produced by these activities into structured knowledge, the approach comprising building a knowledge model for stakeholder needs with the aid of domain experts; extracting the information contained in SKA science and technical use cases and populate it into a system model derived from the knowledge model; expanding the domain model with knowledge relating to typical radio telescope structure and characteristics, since these determine the structure of requirements information; and converting the SKA system requirements into structured information and populate it into the system model, derived from the expanded domain knowledge model and augmented as needed.

In another embodiment of the present invention, stakeholder needs are structure, wherein the first step is to capture domain knowledge relating to stakeholder needs. The knowledge consists of two parts: typical desired system capabilities and quality concerns; and system engineering aspects of the context i.e. the set of stakeholders, their goals and the processes needed to achieve the goals. Table 3 shows a partial view of the resulting structure.

TABLE 3

Partial knowledge model of typical stakeholder needs for radio telescopes

Attribute Direction
Capability Imaging
Capability AnalyzeLineSpectrum
Capability CalibrateFlux
Capability IntegrateRFSignal
Capability CorrelateRFSignal
Capability ChannelizeRFSignal
Capability AnalyzeData
Capability MeasureRFSignalFlux
Quality Goal FieldOfView
   Characteristic MaxFieldOfView
Stakeholder Engineer
   Functional Goal EnsureDataQuality
     Capability MonitorData
     Capability Calibrate
   Quality Goal LimitRFI
     Attribute MaxAllowedRFI There are two ways to utilize the structure shown in Table 3. It may be used only to define the template into which the needs from the specific system are populated. Alternatively, domain knowledge about typical needs can also be prepopulated into the structure to facilitate knowledge reuse e.g. high-level use cases for engineering activities. In either case, the structure needs to be instantiated (customized) to the particular system. Instantiating may involve filtering out particular items as being inapplicable, adding new items and elaborating items to reflect system-specific details. For example, high-level use cases may be refined into system-specific use cases.

In another embodiment of the present invention, SKA stakeholder needs model is provided, wherein the second step is to populate information from the science and technical use cases to build a needs model for SKA. In the case of SKA, the science use cases were expressed in the form of a typical science proposal, identifying the set of instrument capabilities and operational parameters needed to achieve a particular science goal. The set of use cases relevant to each telescope were identified, and information from all of them was merged (e.g. use cases identify particular frequency bands; these were combined to create a list of desired bandwidth ranges) and then populated into the structure instantiated from the domain knowledge model. The technical use cases for SKA were represented in the form of processes for achieving stakeholder goals e.g. performing QA checks. The extracted the capabilities and quality characteristics needed to perform each activity in the process, and then populated them also into the stakeholder needs structure. The resulting stakeholder needs model is a list of all the capabilities and quality characteristics needed to achieve all the functional and technical use cases. While some of these capabilities may be provided by the system, others may be provided by the context, including role-playing stakeholders.

A fragment from the resulting populated structure is shown in Table 4. As mentioned above, the attributes and quality characteristics shown are simply aggregated from the specific set of use cases identified for the system. Subsequently, during requirements establishment, it is common to generalize these needs in order to cover a wider range of scenarios.

TABLE 4

SKA needs model: domain model instantiated
and populated with SKA needs

Stakeholder RadioAstronomer
    Functional Goal SpectralLineImaging
        Capability ReceiveRFSignal
            Attribute ReceivingFrequency = 350-1050, 1368-1468,
            8750-11250, 12750-13250
    Quality Goal FieldOfView
        Characteristic FieldOfView = 1.4 deg@700 MHz, 1 arcmin@13
        GHz, 1.5 deg@1418 MHz In another embodiment of the present invention, system requirements structure is provided, wherein the requirements for a system mostly relate to the set of desired system elements and their characteristics, while there are a few other requirements that relate to process and technology aspects. To facilitate requirements establishment, one can create reusable domain knowledge that identifies the typical set of system elements and their attributes. This includes not only the core functional system elements, but also the required system resources e.g. networks, physical infrastructure, computational infrastructure. It also includes a model of the applicable system context e.g. astronomical catalogues. Table 5 shows a fragment of the knowledge model for radio telescope requirements. This includes multiple possible receptor types—the instantiation process for capturing specific system requirements using this structure should select the elements relevant to the particular instrument. It shows the astronomical catalogue modelled as a context entity (a naming convention is used to indicate that it belongs to the context rather than the system). It is also shown that the domain knowledge model can include populated values that can be utilized during instantiation.

TABLE 5

Domain knowledge model for radio telescope requirements

Entity RadioTelescope
    Entity Receptor
        Attribute BandSpec

TABLE 5-continued

Domain knowledge model for radio telescope requirements

Function ReceiveRFSignal
            Property MaxFieldOfView
    Entity DipoleAntenna->Receptor
    Entity DishAntenna->Receptor
        Attribute Direction
        Attribute Diameter
    Entity Context_Catalogue
        Attribute url = catalogue_url Since it is normal for particular systems to introduce new types of elements, and also to capture requirements that relate to aspects other than the product, this structure produced from domain knowledge cannot be expected to be comprehensive: it only provides a starting point, and is likely to need extensive augmentation in addition to customization. This reflects the fact that while the stakeholder needs are independent of any specific solution, the requirements reflect a particular system concept, which is a creative step that introduces new elements. This limits the extent to which domain knowledge can serve as a checklist for ensuring requirements completeness: it provides a starting point that covers a substantial fraction of the requirements, but there is a need to complement it with analysis of coverage of the stakeholder needs.

In another embodiment of the present invention, SKA system requirements are provided, wherein before populating the SKA system requirements into the system model, it should be converted it into structured information. System requirements are typically expressed as natural language statements. However, many of the requirements statements have some commonalities in their structure, such as a particular system element should exist, or have a particular capability, or the element or one of its capabilities should have a particular characteristic i.e. a particular attribute should have a particular value or range of values. There may be a couple of modifiers. Some capabilities or attributes may have an object e.g. capability to interact with another element or system. There may also be constraints associated with the requirement e.g. applicability only in a specific set of situations. Not every requirement fits within the above structure, but the vast majority of them can be mapped to it. Many of the remaining ones can be regarded as directly imposing a constraint on the system or a particular element or capability. Even requirements relating to technology and process aspects can be viewed in this way. Some requirements end up as special cases not amenable to easy conversion to structured information. Most of the SKA system requirements are converted into structured information using a template, as shown in Table 6.

TABLE 6

Converting SKA system requirements into structured information

| ID | Telescope | Entity | Capability | Attribute | Value | Units | Constraints |
|---|---|---|---|---|---|---|---|
| REQ-2150 | SKA1_Low | Correlator | Integration | Visibility Integration Periods | 0.6-6 | secs | Independently configurable for each subarray |
| REQ-2248 | SKA1_Survey | Digitizer | | Quantisation Effective Bits | 8 | bits | |
| REQ-2207 | SKA1_Mid | Beamformer | Forming dual polarisation coherent beams | Number of beams | 16 | beams | |
| REQ-2180, 2181, 2282, 2283, 2284 | SKA1_Mid | Dish Antenna | receiveRFSignal | Receiving Frequency | 350-1050, 950-1760, 1650-3050, 2800-5180, 4600-13800 | Mhz | |

The resulting structured information can be populated into the structure shown in Table 5, with augmentations as needed e.g. new types of entities, new capabilities not contained in the domain model etc. It is a matter of technical judgment whether these augmentations should be propagated back to the domain knowledge model. The columns that were used to convert the requirements into structured information can be easily added to a requirements management tool such as Jama. By doing so, one can automatically populate the knowledge structure with the requirements information, as requirements change over time. Some manual efforts are still needed, since not all requirements and not all information associated with the requirements (e.g. constraints) are amenable to conversion to machine-parseable representations. Thereby, above approach enabled to build a family of models corresponding to the SKA requirements artifacts as well as models of the underlying domain knowledge.

In another embodiment of the present invention, provided herein is usage of the models for requirements establishment and analysis. There are several benefits to populating requirements information into a knowledge structure such as a) checklists towards ensuring completeness (b) knowledge reuse across projects c) consistency checks within and across models d) consistency checks on requirements change e) information flow across tools based on import/export of data. The following subsections touch upon each of these aspects illustrated with some examples.

In another embodiment of the present invention, provided herein is domain knowledge as checklists for completeness, wherein the structures for capturing needs and requirements tend to have substantial commonalities across projects in the domain, with variability typically arising from alternative choices for elements. Both the commonalities and the possible range of variability's can be populated into the domain knowledge models along with associated knowledge content.

The set of capabilities, quality goals, elements and attributes from the domain knowledge models serve as a checklist for establishing needs and requirements, providing an aid to completeness.

In another embodiment of the present invention, provided herein is reuse of knowledge across projects, wherein projects create several information items such as lists of stakeholders, use cases, quality concerns etc. While some of these might be very specific to the project, much of the content is likely to be similar or identical for other projects. Any information that is likely to be more widely useful can be propagated back into the domain knowledge models and made available to other projects. The instantiation step between domain models and system information provides an explicit applicability check so that inapplicable information can be discarded or modified suitably.

In another embodiment of the present invention, provided herein is enabling consistency checks, wherein requirements artifacts are converted into information in a well-defined structure enables a number of consistency checks such as simple syntactic consistency checks e.g. element names; monitoring consistency across artifacts e.g. between requirements and needs; and monitoring consistency with domain knowledge. It should be noted that consistency between artifacts is monitored rather than enforced i.e. warnings are provided if the requirements does not meet the defined needs, but it is possible that this is an intentional choice due to tradeoffs or generalization. Similarly, inconsistencies with domain knowledge may arise from system-specific choices and aspects. The effectiveness of consistency checks can be improved by enabling engineers to explicitly specify the logic of instantiation of system models from knowledge models, and the mappings from stakeholder needs to requirements, including any modifications arising from tradeoffs or generalization. The types of consistency checks that can be carried for asserting requirement completeness is well established. A few rules are implemented based on the standard theory to perform consistency checks across the following documents of the SKA project: Science Use Case, Technical Use Case and the SKA Level 1 requirements document. The consistency rules were implemented using the EMF Validation Framework6 of Eclipse. Following are some examples of the rules that were written 1) the names of the entities and attributes appearing across the various artefacts were consistent 2) that the values assigned to the various attributes were consistent between the requirements and needs model, based on a defined set of expected correspondences 3) that all the capabilities identified from the use cases are allocated either to a system entity or a role-playing stakeholder. Table 7 shows an example of the results produced by our consistency checker.

TABLE 7

Results of consistency checking across models

Entity DataAnalyser in Stakeholder Needs was not found in System Requirements
Entity QATestSuite in Stakeholder Needs was not found in System Requirements
Entity QADataStore in Stakeholder Needs was not found in System Requirements
The attribute Flux Calibration is not matching between Stakeholder Needs and System Requirements !
The attribute Operation mode is not matching between Stakeholder Needs and System Requirements !

Matched Entity: Receptor at ID = SKA1-SYS_REQ-2671
Matched Attribute: BW with value 300 mhz at ID = SKA1-SYS_REQ-2215

The results show both the entities and attributes that were matched across models, as well as mismatches between the models. As discussed above, simple consistency checking can throw up false positives if there are many-to-many mappings between capabilities in the Needs model and functions in the Requirements model, or if there are generalizations and omissions. Explicitly specifying these relationships will not only suppress false positives, but enable the consistency checker to monitor that the specified relationships continue to exist.

In another embodiment of the present invention, provided herein is consistency checks on requirements change, wherein requirements management tools maintain traceability information to facilitate propagation of changes. However, it is still up to people to ensure that the results are consistent. With tool support for consistency checks, it is much easier to ensure that when requirements change, all the related models are updated appropriately. The consistency relationships defined between models (e.g. every capability in the system needs must be addressed by one or more corresponding functions in some element, with match/coverage among attributes) are an enhancement of the traditional concept of traceability to content mappings among models that can be monitored. It should be noted that it may not be possible to automate all consistency checks e.g. fields such as constraints are not machine-readable. This is a significant benefit in a project such as SKA where requirements are likely to continue changing over the next several years, based on the funding situation, new technologies, improved design understanding and other change drivers. Change impact analysis would be considerably easier if tools could provide more support for analyzing how particular changes affect decisions in other artifacts.

In another embodiment of the present invention, provided herein is enabling information flow across tools based on import and export, wherein maintaining all requirements-related information as structured data raises the possibility of import/export from the actual tools used by the project, especially if the tools themselves can be configured to support structuring of information. For example, it is relatively straightforward to add fields such as the ones depicted in Table 6 to Jama, so that the requirements statements are also expressed as structured information that can be easily imported into our model. Export of information from our model to Jama is also possible based on matching of Requirements IDs. However, human intervention will still be needed to frame the resulting structured information into good requirements statements. A secondary benefit of adding structured representations of domain content within Jama is that it eliminates ambiguities and brings in simple consistency checks e.g. that the entities, attributes and capabilities identified in the Requirements are named consistently throughout the document and drawn from a managed list of system elements. Similarly, SysML tools can be used in a modelling mode rather than a diagramming mode, so that use case diagrams directly map interactions to entities and capabilities. Some information such as attributes will have to be handled as annotations (if supported by the tooling). Given the right project disciplines and tool features, it may be possible to automatically import/export information with modelling tools as well.

In general, the structuring of information into a metamodel enables the creation of a common repository of system information across multiple tools used in systems engineering, with import and export facilities to support consistency maintenance across them. The contents of Internal Block Diagrams and Activity diagrams in SysML map to entities, functions and attributes in our model, that in turn map to the elements identified in requirements statements in requirements management tools. The bridge between our tool and external tools can be built as one-time investments for each specific third party tool. The result would be a single repository of all information related to requirements establishment, which is also linked to underlying domain knowledge. If import/export is implemented, it raises the interesting possibility of propagating a change from one tool to another, possibly with some human support. Consider the following scenario. A use case is modified to have an extra step that requires an additional capability from an existing entity. Ideally, when the updated use cases are imported into our environment, then consistency checking indicates the need for adding a new function to that particular system element. In turn, when this is imported into the requirements management tool, it triggers the creation of a new requirement corresponding to the newly added capability. The new requirement which may include additional constraints and qualifiers is imported back into the repository, and propagated back to the use case, perhaps resulting in an annotation mentioning the qualifiers. Ultimately, this type of round-tripping across tools is the scenario that our research aims to enable. If one could enable consistency checking across the various tools used on projects, and a common repository of system knowledge, that would have a significant impact on effort, cycle time and quality.

What is claimed is:

1. A method for building a domain intelligent solution; said method comprising processor implemented steps of:
   a. utilizing a language or vocabulary for capturing intrinsic knowledge pertaining to a technical domain using a language utilization module (204);
   b. creating a domain intelligent solution for the technical domain using said language or vocabulary in a domain intelligent solution creation module (206), wherein creating the domain intelligent solution comprises the steps of:
      capturing a set of concepts related to the technical domain using a metamodel (302); wherein the metamodel is built using the set of concepts identified as a set of model elements and their interdependencies pertaining to the technical domain;
      enabling user to populate a domain awareness module (304) with a specified knowledge related to the technical domain in an interactive environment (306); wherein the user populates the specified knowledge related to the technical domain in form of use cases and requirement statements, expressed in said language or vocabulary;
      providing user assistance through a structured information, using a dependency detection module (308); wherein the user assistance is provided through converting the specified knowledge populated by the user into the structured information by auto detection of a set of potential dependencies of the technical domain related to the specified knowledge, based on the metamodel; and
      performing verification on the specified knowledge by performing consistency check using a verification module (310);
   c. translating the domain intelligent solution into required wrappers for them to be integrated with a third party technology or tool using a compiler and translation module (208); and
   d. integrating said created domain intelligent solution with the third party technology or tool for providing system engineering capabilities to make them domain intelligent using a domain intelligent solution integration module (210).

2. The method as claimed in claim 1, wherein the set of concepts related to the technical domain is selected from a group comprising of requirements, design, and testing.

3. The method as claimed in claim 1, wherein translating the domain intelligent solution into required wrappers for them to be integrated with the third party technology or tool using the compiler and translation module (208) is done through automatic generation of additional libraries or wrappers.

4. The method as claimed in claim 1, wherein the domain intelligent solution is retrofitted with the information created using the third party technology or tool.

5. The method as claimed in claim 1, further comprises of storing, fetching, enabling versioning, exporting the domain intelligent solution and associate knowledge using a repository (212).

6. A system (200) for building a domain intelligent solution;
   said system (200) comprising:
   a processor (202); and
      a memory coupled to the processor (202), wherein the processor (202) executes a plurality of modules stored in the memory, and wherein the plurality of modules comprises:

a language utilization module (204) adapted for utilizing a language or vocabulary for capturing intrinsic knowledge pertaining to a technical domain;

a domain intelligent solution creation module (206) adapted for creating a domain intelligent solution for the technical domain using said language or vocabulary in a domain intelligent solution environment (300), wherein the domain intelligent solution environment (300) comprises:

- a metamodel (302) adapted for capturing a set of concepts related to the technical domain; wherein the metamodel is built using the set of concepts identified as a set of model elements and their interdependencies pertaining to the technical domain;
- an interactive environment (306) adapted for enabling user to populate a domain awareness module (304) with a specified knowledge related to the technical domain; wherein the user populates the specified knowledge related to the technical domain in form of use cases and requirement statements, expressed in said language or vocabulary;
- a dependency detection module (308) adapted for providing user assistance through a structured information; wherein the user assistance is provided through converting the knowledge populated by the user into the structured information by auto detection of a set of potential dependencies of the technical domain related to the specified knowledge, based on the metamodel; and
- a verification module (310) adapted for performing verification on the specified knowledge by performing consistency check;

a compiler and translation module (208) adapted for translating the domain intelligent solution into required wrappers for them to be integrated with a third party technology or tool; and a domain intelligent solution integration module (210) adapted for integrating said created domain intelligent solution with the third party technology or tool for providing system engineering capabilities to make them domain intelligent.

7. The system as claimed in claim 6, further comprises of a repository (212) adapted for storing, fetching, enabling versioning, exporting the domain intelligent solution and associate knowledge.

* * * * *